(12) United States Patent
Sellmeyer et al.

(10) Patent No.: US 11,292,578 B2
(45) Date of Patent: Apr. 5, 2022

(54) COMPOSITE AERODYNAMIC STRUCTURE

(71) Applicant: SPIRIT AEROSYSTEMS, INC., Wichita, KS (US)

(72) Inventors: Scott Sellmeyer, Wichita, KS (US); Blaise Francis Bergmann, Clearwater, KS (US); Darin Clay Wiley, Wellington, KS (US); Roger Edmund Kornfeld, Whitewater, KS (US); Walter A. Chappelle, Wichita, KS (US); Aaron Rae Heitmann, Highlands Ranch, CO (US)

(73) Assignee: SPIRIT AEROSYSTEMS, INC., Wichita, KS (US)

( * ) Notice: Subject to any disclaimer, the term of this patent is extended or adjusted under 35 U.S.C. 154(b) by 153 days.

(21) Appl. No.: 16/684,118

(22) Filed: Nov. 14, 2019

(65) Prior Publication Data
US 2021/0147064 A1 May 20, 2021

(51) Int. Cl.
*B64C 3/26* (2006.01)
*B64C 3/54* (2006.01)
*B64C 3/14* (2006.01)

(52) U.S. Cl.
CPC .................. *B64C 3/26* (2013.01); *B64C 3/14* (2013.01); *B64C 3/54* (2013.01)

(58) Field of Classification Search
CPC .... B64C 3/26; B64C 3/14; B64C 3/54; B64C 2027/4736; B64C 27/48
See application file for complete search history.

(56) References Cited

U.S. PATENT DOCUMENTS

| | | | | |
|---|---|---|---|---|
| 4,095,322 A | * | 6/1978 | Scarpati | B29C 70/345 156/182 |
| 4,095,760 A | * | 6/1978 | Sommer | B64C 3/26 156/85 |
| 4,169,749 A | * | 10/1979 | Clark | B29C 33/0016 156/156 |
| 4,260,332 A | * | 4/1981 | Weingart | F03D 7/0224 416/226 |
| 4,316,701 A | * | 2/1982 | Scarpati | B64C 27/473 416/226 |
| 9,944,356 B1 | * | 4/2018 | Wigley | B63B 3/38 |
| 2002/0164251 A1 | * | 11/2002 | Sehgal | B64C 27/48 416/134 A |

FOREIGN PATENT DOCUMENTS

| | | | | |
|---|---|---|---|---|
| FR | 2616409 A1 | * | 12/1988 | B64C 27/473 |
| WO | WO-2015102521 A1 | * | 7/2015 | B64C 27/473 |

* cited by examiner

*Primary Examiner* — Brian M O'Hara
(74) *Attorney, Agent, or Firm* — Hovey Williams LLP

(57) ABSTRACT

A monolithic skin for an aerodynamic structure is provided. The skin comprises a root end defining a root opening; a tip end opposite to the root end; a trailing-edge portion defining a slot opening extending from the root opening toward the tip end; a leading-edge portion extending spanwise from the root end to the tip end; and a middle portion extending between the trailing edge and the leading-edge portion and at least partially defining an open slot in fluid communication with the slot opening and root opening. The middle portion comprises an interior surface facing the open slot that is graded so that the middle portion decreases in thickness spanwise toward the root end. The middle portion also comprises a first integrated spar section extending from the interior surface to the tip end.

5 Claims, 11 Drawing Sheets

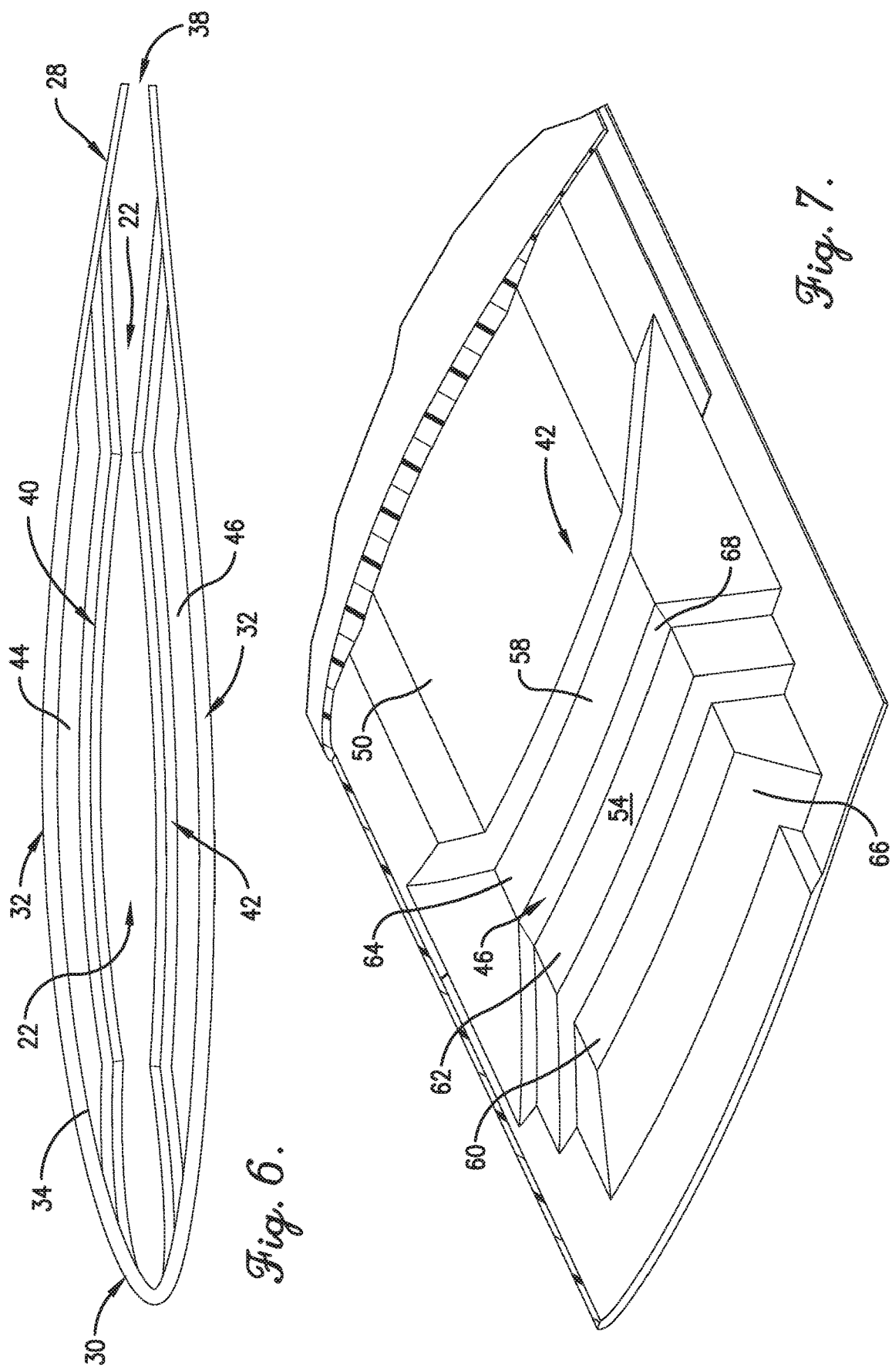

COMPOSITE AERODYNAMIC STRUCTURE

BACKGROUND

Aerodynamic structures such as aircraft wings typically have one or more internal structural beams (or "spars"), separate skins for upper and lower surfaces, and separate leading and trailing edge pieces. The spars cooperate with the upper and lower skins to handle the bending loads caused by forces applied to the structure while in motion, such as weight loads during flight.

However, several disadvantages exist for this configuration. The multiple pieces are expensive to manufacture and then assemble. Furthermore, it is nearly impossible to perfectly align the joints between the multiple pieces; therefore, gaps, non-flush surfaces, fastener protrusions, and similar conditions may result and increase aerodynamic drag. Also, the fasteners required to secure the assemblies together inherently add weight.

The background discussion is intended to provide information related to the present invention which is not necessarily prior art.

SUMMARY

The present invention solves the above-described problems and other problems by providing aerodynamic structures that are less expensive to manufacture and that have improved aerodynamic characteristics. Embodiments of the invention include a monolithic skin for an aerodynamic structure, an improved composite aerodynamic structure, and a method for manufacturing both.

A skin of an aerodynamic structure constructed in accordance with an embodiment of the present invention broadly comprises a root end defining a root opening, a tip end opposite to the root end, a trailing edge, a leading-edge portion, and a middle portion. The trailing edge defines a slot opening extending from the root opening toward the tip end. The leading-edge portion extends spanwise from the root end to the tip end.

The middle portion extends between the trailing edge and the leading-edge portion and at least partially defines an open slot in fluid communication with the slot opening and root opening. The middle portion comprises an interior surface and a first integrated spar section. The interior surface faces the open slot and is graded so that the middle portion decreases in thickness spanwise toward the root end. The first integrated spar section extends from the interior surface to the tip end. The integrated spar section obviates the need to manufacture and assemble a leading edge, a top skin, and a bottom skin to enclose spars. This decreases the cost of manufacturing the skin and improves its weight and aerodynamic characteristics. The open slot of the skin enables it to be flexed and removed from the tool, which allows for its monolithic structure.

A composite aerodynamic structure constructed in accordance with an embodiment of the present invention may include the skin described above and further include a hub, a wingtip, and a trailing edge panel. The hub comprises an aircraft interface portion and an insert. The insert is connected to the aircraft interface and extends into the root opening of the skin. The insert comprises a joint interface complementary to the interior surface of the skin and is attached thereto. The wingtip comprises a flange extending into the tip opening and is attached to the skin inside the open slot. The trailing edge panel comprises a pair of layers forming a tab and a tapered portion and a layer of metal. The tab is positioned in the open slot and extends from the root end to the tip end of the skin. The tapered portion is attached to the tab and extends from the root end to the tip end of the skin. The layer of metal is sandwiched between the pair of layers and extends from the tab to the tapered portion. The trailing edge panel seals the open slot of the skin and provides a thin and durable trailing edge in the form of the metal layer.

Another embodiment of the invention is a method of forming a skin of an aerodynamic structure. The method comprises positioning a plurality of plies on a tool to form a skin comprising a first integrated spar section extending from a graded surface of the tool to a tip end of the skin; curing the skin; flexing the skin so that a trailing-edge opening of the skin is expanded; and removing the skin from the tool.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 6 is an end view a skin of the composite aerodynamic structure of FIG. 1;

FIG. 7 is a sectional view of a hub interfacing with the skin of the composite aerodynamic structure of FIG. 1;

Figure 1:
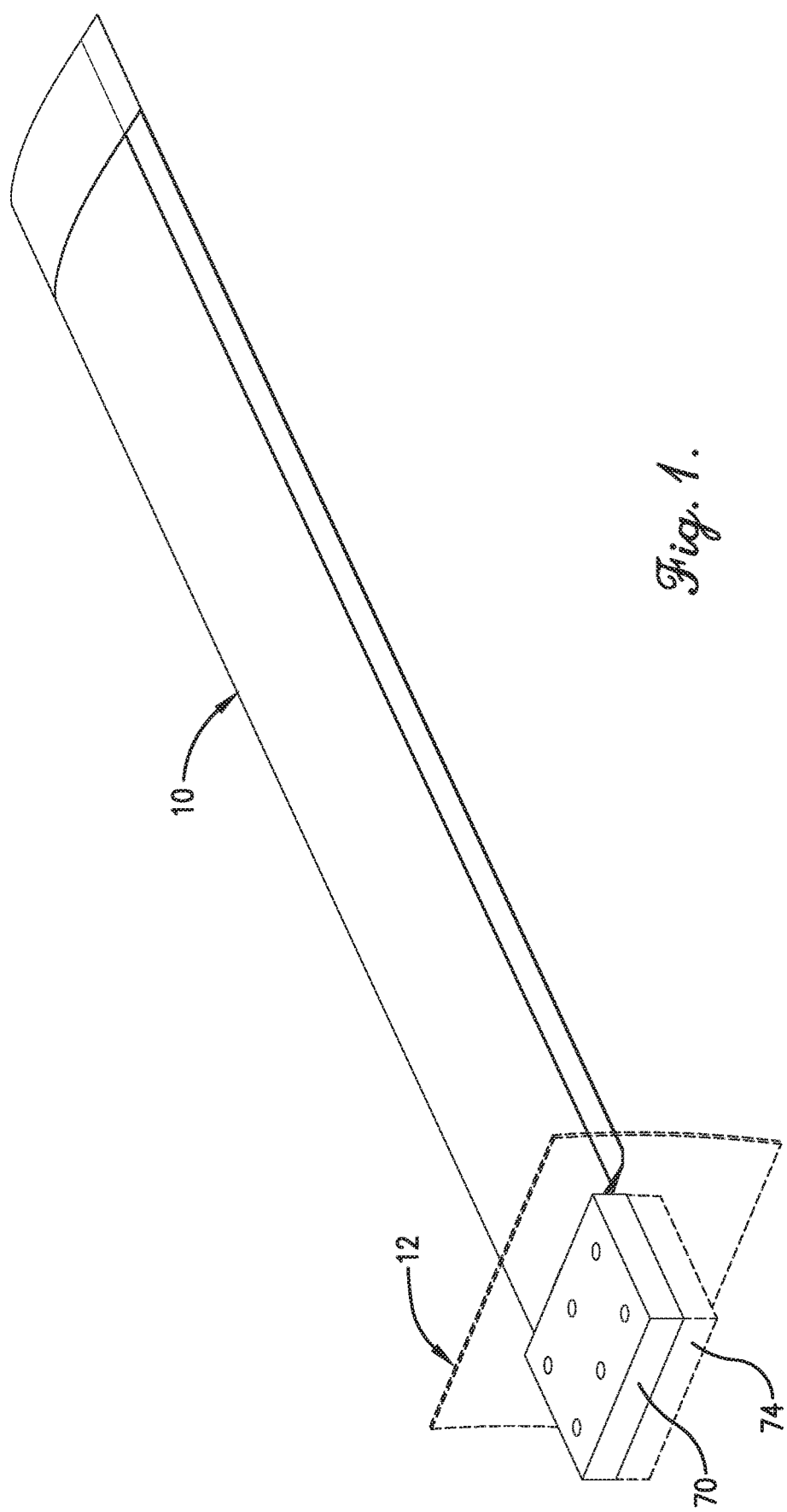
FIG. 1 is a perspective view of a composite aerodynamic structure constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

FIG. 1 illustrates a composite aerodynamic structure, such as a composite wing 10, constructed in accordance with an embodiment of the invention attached to a portion of an aircraft (or other machine) 12. The portion of the aircraft 12 may be part of a jet, plane, missile, rocket, or the like. The composite wing 10 may be used to guide and/or provide lift to the aircraft 12.

Figure 2:
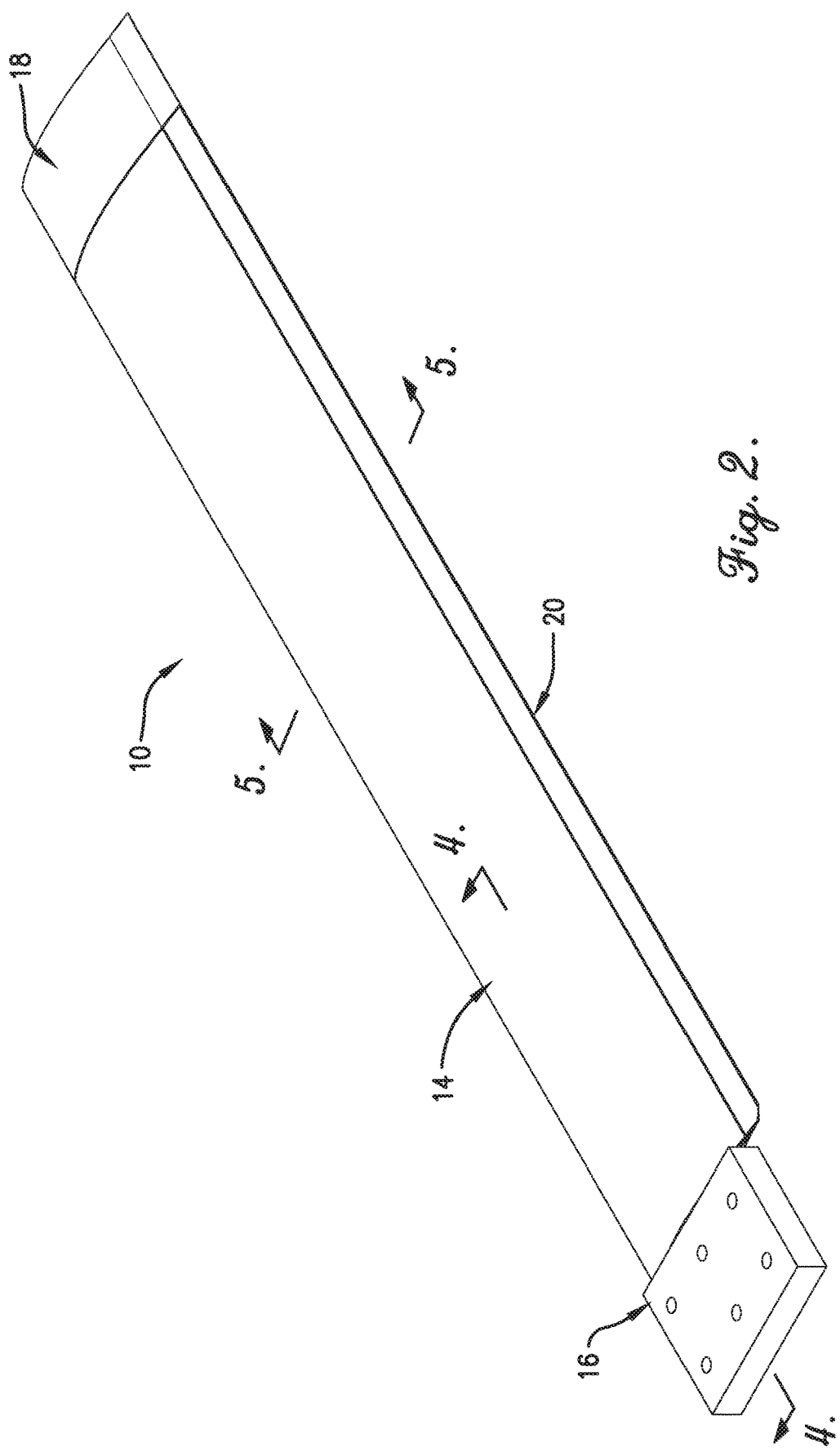
FIG. 2 is a perspective view of the composite aerodynamic structure of FIG. 1.
Figure 3:
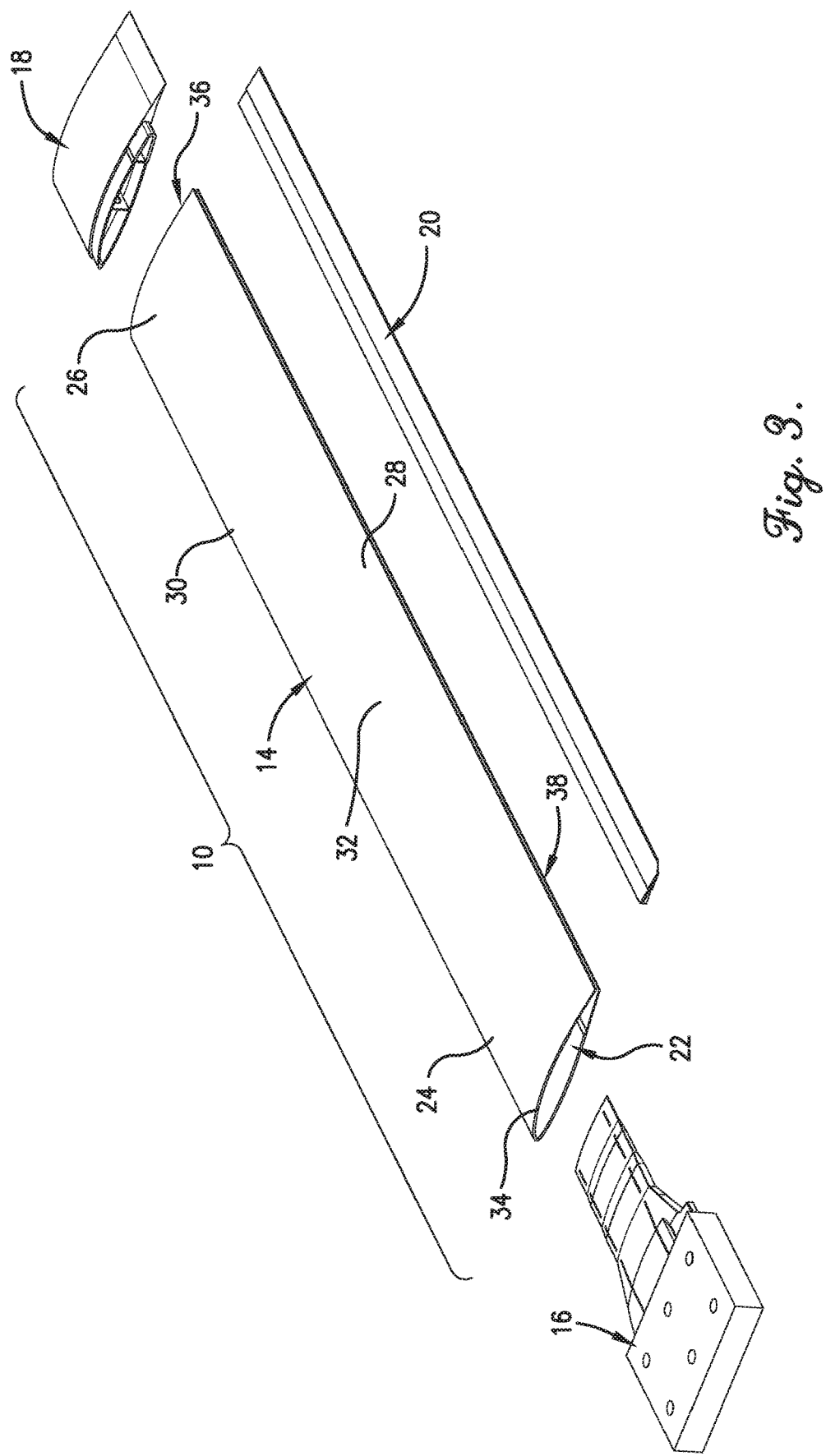
FIG. 3 is an exploded view of the composite aerodynamic structure of FIG. 1.

Turning to FIGS. 2 and 3, an embodiment of the composite wing 10 broadly comprises a wing skin 14, a hub 16, a wing tip 18, and a trailing-edge panel 20. The wing skin 14 is a monolithic piece that defines an open slot 22 and comprises a root end 24, a tip end 26, a trailing-edge portion 28, a leading-edge portion 30, and a middle portion 32. The root end 24 defines a root opening 34 for receiving the hub 16. The tip end 26 defines a tip opening 36 for receiving the wing tip 18. The trailing edge portion 28 defines a trailing-edge opening 38 (best depicted in FIG. 6) for receiving the trailing-edge panel 20. The trailing-edge opening 38 may extend from the root opening 34 to the tip opening 36, and all openings 34, 36, 38 may be in fluid communication with the open slot 22.

Figure 5:
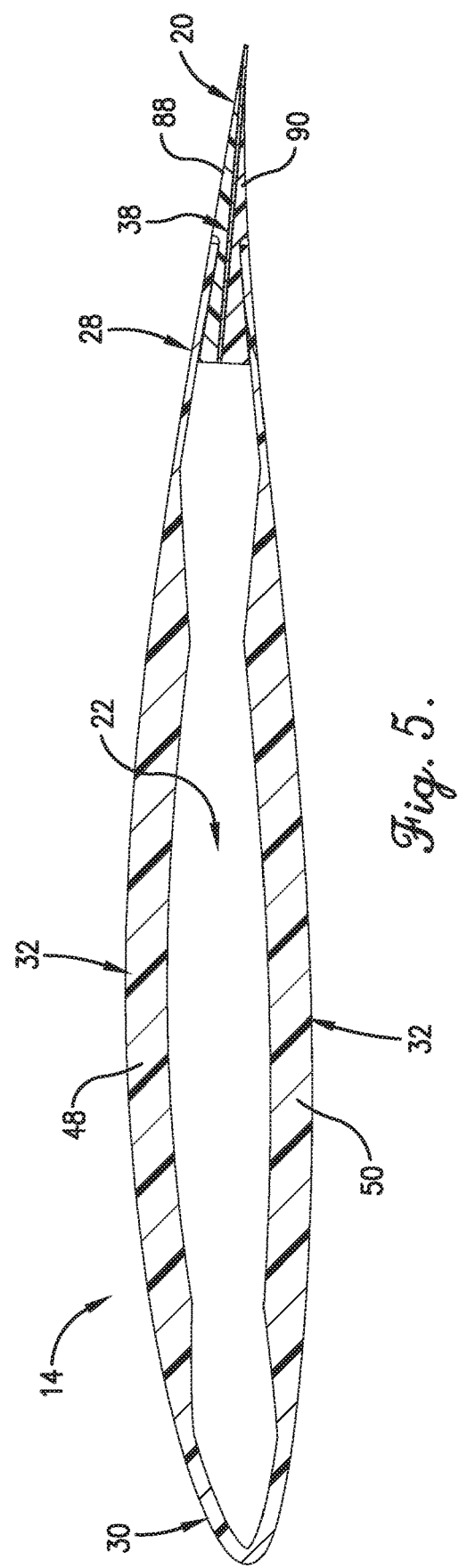
FIG. 5 is a cross-sectional view of the composite aerodynamic structure as viewed along the line 5-5 in FIG. 2.

The leading-edge portion 30 extends from the root end 24 to the tip end 26 and is thicker than the trailing-edge portion 28, as shown in FIGS. 5 and 6. For example, the leading-edge portion 30 may be at least 20% to at least 200% thicker than the trailing-edge portion 28. In some embodiments, the leading-edge portion 30 may be 120% thicker than the trailing-edge portion 28. For example, the leading-edge portion 30 may comprise 22 plies of a material, and the trailing-edge portion 28 may comprise 10 plies of a material. However, the leading-edge portion 30 may be thin enough to flex to help, at least in part, the open slot 22 and/or the trailing-edge opening 38 to expand. For example, the leading-edge portion 30 may be c-shaped to define a leading-edge portion of the slot 22 and may flexibly open to enable, at least in part, the slot 22 and/or the trailing-edge opening 38 to expand by at least 50%.

Figure 4:
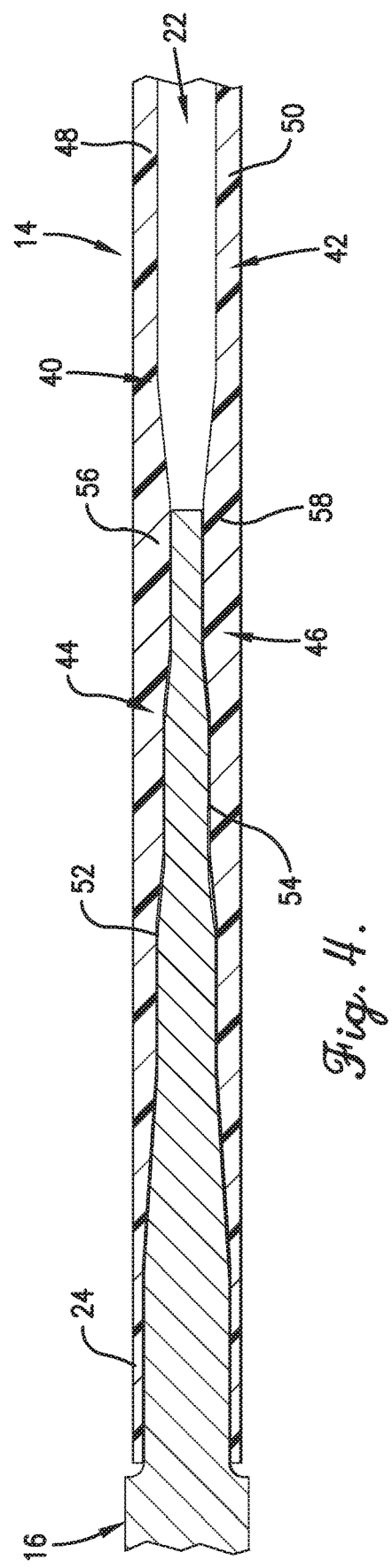
FIG. 4 is a fragmentary, cross-sectional view of the composite aerodynamic structure from the perspective indicated by line 4 in FIG. 2.

The middle portion 32 extends between the leading-edge portion 30 and the trailing-edge portion 28 and at least partially defines the open slot 22. The middle portion 32 may comprise a first integrated spar section 40 and a second integrated spar section 42. The first and second integrated spar sections 40, 42 provide structural strength to the composite wing 10 and may each comprise hub interfaces 44, 46 and spar regions 48, 50. The hub interfaces 44, 46 are adjacent to the root end 24 and include interior surfaces 52, 54 that may be graded so that the integrated spar sections 40, 42 decrease in thickness spanwise toward the root end 24, as depicted in FIG. 4. The hub interfaces 44, 46 may be shaped to be complementary to a portion of the hub 16 (discussed further below). The hub interfaces 44, 46 may include portions 56, 58 that are thicker than the spar regions 48, 50, and the interior surfaces 52, 54 may comprise one or more plateaus 60, 62, 64 and ramps 66, 68 (as depicted in FIG. 7) for increasing surface area contact between the interfaces 44, 46 and a portion of the hub 16. The spar regions 48, 50 extend from the hub interfaces 44, 46 to the tip end 26. The middle portion 32 may have any number of integrated spar sections without departing from the scope of the present invention. For example, the middle portion 32 may only comprise one spar section, or it may comprise multiple spar sections on each side of the open slot 22.

Figure 8:
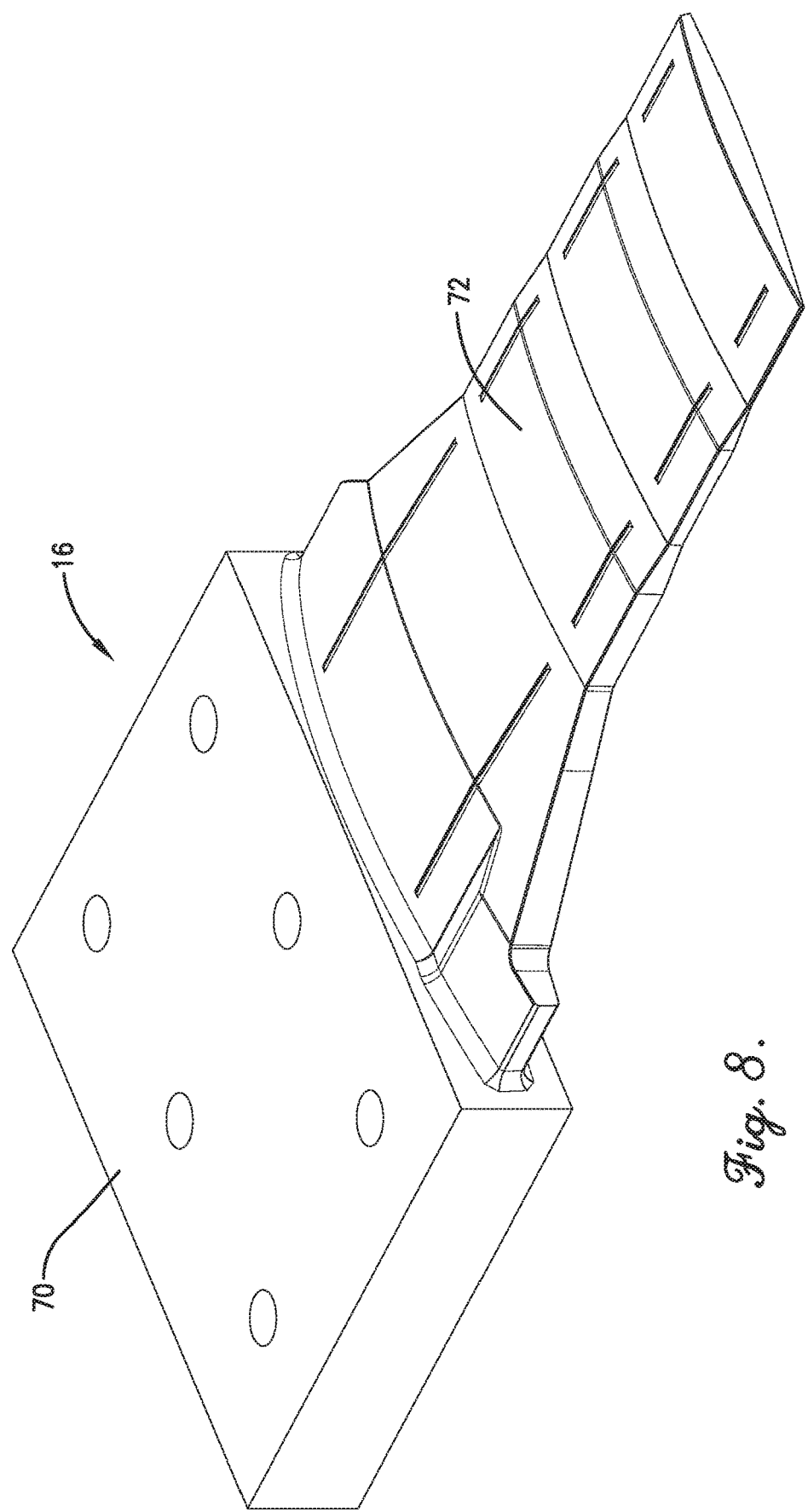
FIG. 8 is a perspective view of the hub of the composite aerodynamic structure of FIG. 1.
Figure 9:
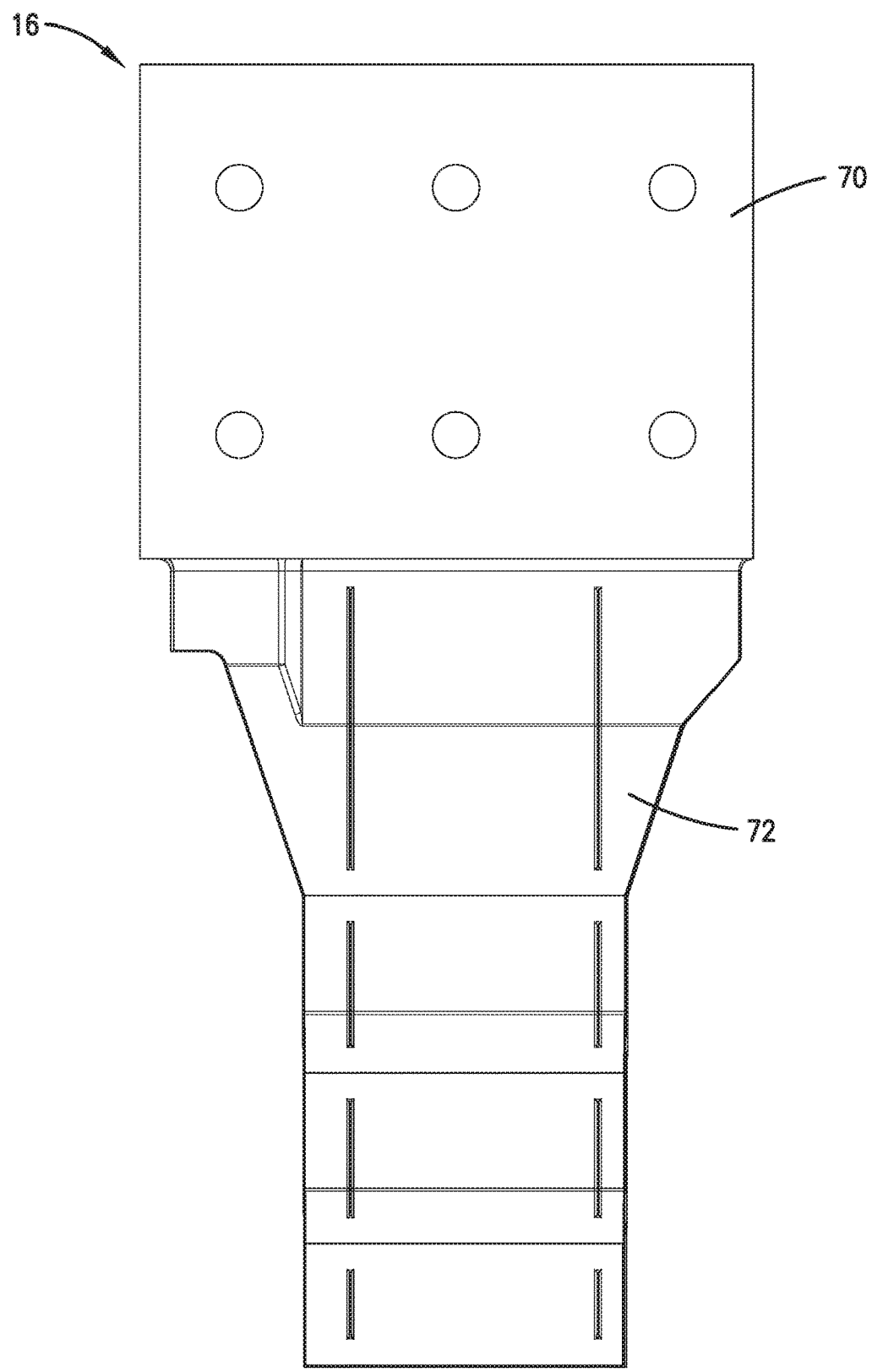
FIG. 9 is a top perspective view of the hub of FIG. 8.

Turning to FIGS. 8 and 9, the hub 16 connects the composite wing 10 to the aircraft 12 and comprises an aircraft interface portion 70 and an insert 72. The interface portion 70 is connected to the aircraft 12, such as on a complementary substrate 74 of the aircraft 12 (as depicted in FIG. 1). The insert 72 is connected to the interface 70 and is operable to be inserted inside the wing skin 14 (as depicted in FIG. 4). The insert 72 may be shaped to complement the surfaces 52, 54 of the hub interfaces 44, 46 of the wing skin 14. The insert 72 may be attached to the interfaces 44, 46 via adhesive. In some embodiments, a fairing (not shown) may be attached to the hub 16 and the wing skin 14 to provide aerodynamic features near the hub 16.

Figure 10:
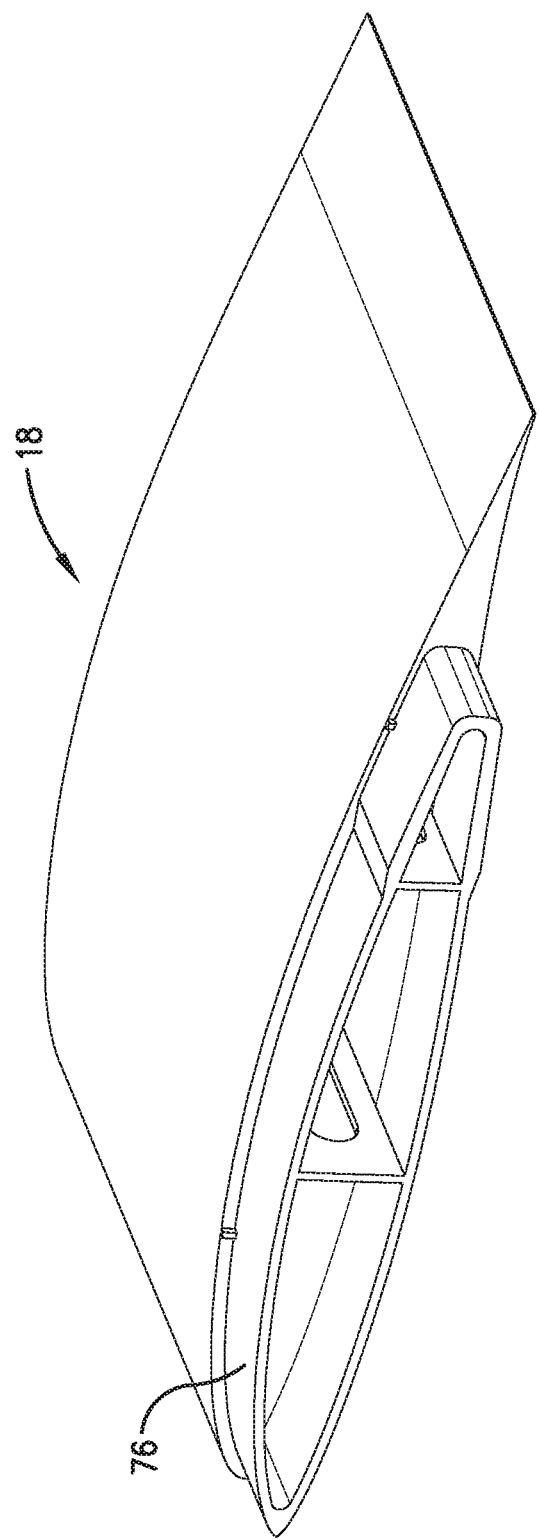
FIG. 10 is a perspective view of a wing tip of the composite aerodynamic structure of FIG. 1.

Turning to FIG. 10, the wing tip 18 is provided to cap the tip opening 36 of the wing skin 14 and is attached to the tip end 26 of the wing skin 14. The wing tip 18 may comprise a flange 76 for being inserted into the tip opening 36 and attaching to an inside surface of the wing skin 14.

Figure 11:
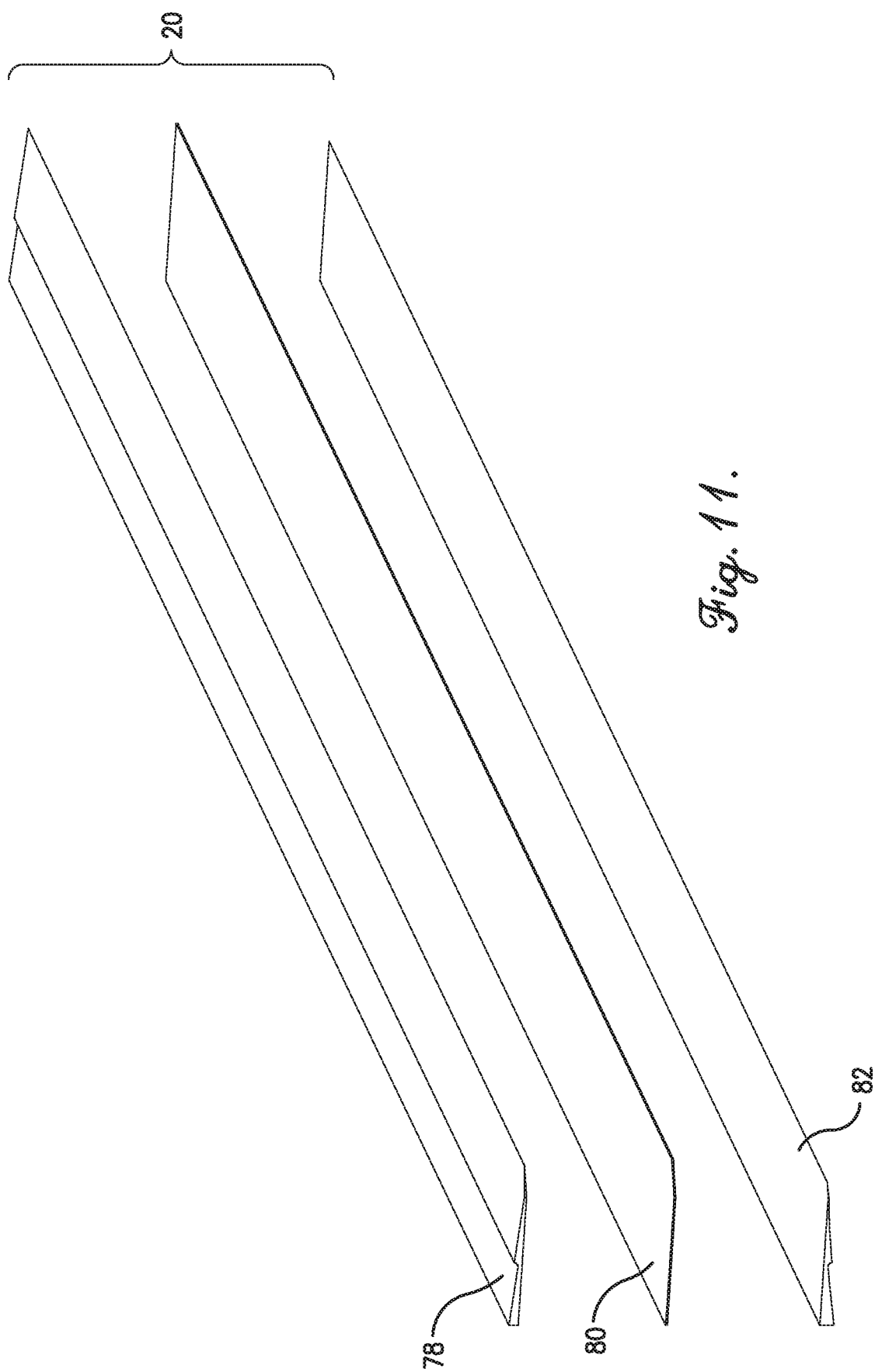
FIG. 11 is an exploded view of a trailing edge panel of the composite aerodynamic structure of FIG. 1.
Figure 12:
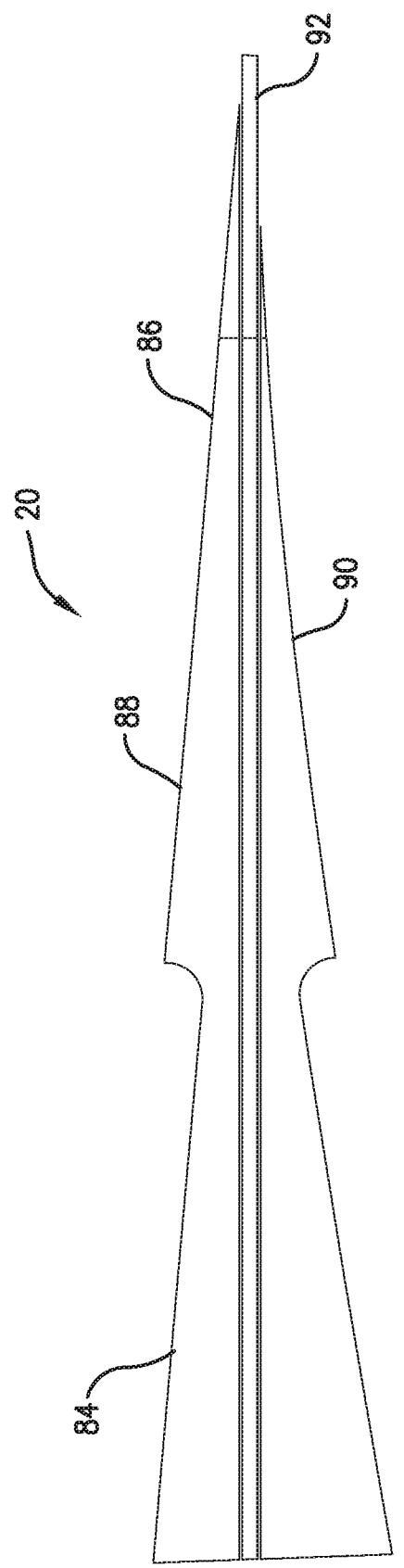
FIG. 12 is an end view of the trailing edge panel of FIG. 11.

Turning to FIGS. 11 and 12, the trailing-edge panel 20 seals the trailing-edge opening 38, which enables the wing skin 14 to have an open slot 22 and therefore be monolithic. The tailing-edge panel comprises a plurality of layers 78, 80, 82 of material sandwiched together to form a tab 84 and a tapered portion 86. The top and bottom layers 78, 82 may comprise thermoplastic material and/or fiberglass and may be machined to form the tab 84 and tapered portion 86. The tab 84 extends from the root end 24 to the tip end 26 and is inserted into the trailing-edge opening 38. The tab 84 may be attached to an inside surface of the trailing-edge portion 28 of the wing skin 10 via an adhesive, which obviates heavy and non-aerodynamic fasteners. The tapered portion 86 comprises a top surface 88 and a bottom surface 90 that are flush with the top and bottom surfaces of the wing skin 14, as depicted in FIG. 5. The tapered portion 86 may gradually thin chordwise so that a portion 92 of the middle layer 80 is exposed. The middle layer 80 may comprise metal, such as stainless steel, to enhance the strength of the trailing-edge panel 20. The exposed portion 92 provides a more durable trailing edge for the composite wing 10, which enables the use of non-metal for the top and bottom layers 78, 82. This helps to reduce manufacturing costs by not using the high amounts of energy and expensive materials necessary for metal manufacturing.

Figure 13:
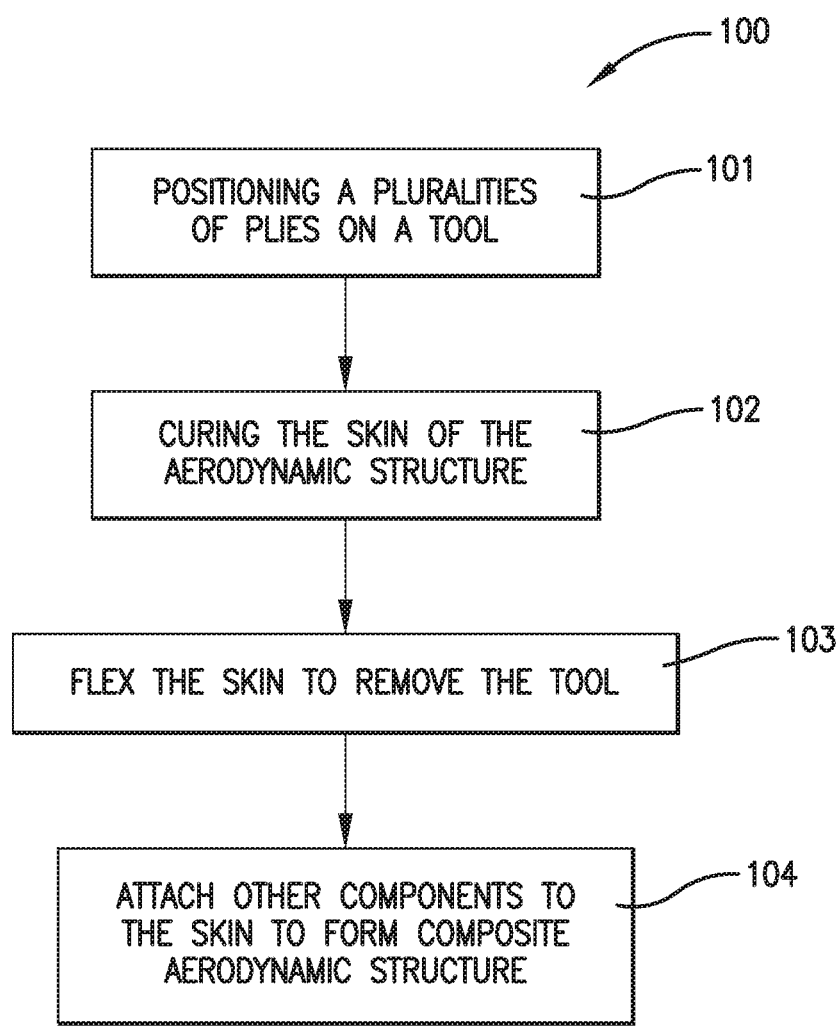
FIG. 13 is a flowchart illustrating at least a portion of the steps of a method for forming a composite aerodynamic structure according to embodiments of the present invention.

The flow chart of FIG. 13 depicts the steps of an exemplary method 100 of forming a composite aerodynamic structure. In some alternative implementations, the functions noted in the various blocks may occur out of the order depicted in FIG. 13. For example, two blocks shown in succession in FIG. 13 may in fact be executed substantially concurrently, or the blocks may sometimes be executed in the reverse order depending upon the functionality involved. In addition, some steps may be optional.

Referring to step 101, a plurality of plies is positioned on a single tool to form a skin of an aerodynamic structure, such as a composite wing. The plies may be applied so that the skin has varying thicknesses. For example, extra plies may be deposited so that a leading-edge portion is thicker than a trailing-edge portion of the skin. Additionally, extra plies may be applied to form a middle portion that is thicker than the leading-edge portion. For example, the leading-edge portion may be formed with around 10-30 plies, the middle portion may be formed with around 30-90 plies, and the trailing-edge portion may be formed with around 5-15 plies. In preferred embodiments, the leading-edge portion may comprise around 22 plies, the middle portion may comprise around 60 plies, and the trailing-edge portion may comprise around 10 plies. Regardless of the number and/or relative ratios of plies of the various regions of the skin, the leading-edge portion is formed with a number of plies that makes the leading-edge portion flexible so that a slot and/or trailing-edge opening in the skin can expand. The plies forming the middle section may be applied from root end to tip end of the skin to form integrated spar sections.

The tool may have a graded surface that imparts a complementary hub interface on an inside portion of the skin. Extra plies may be applied to a portion of the hub interface to provide extra strength at the joint between the hub interface and the hub. For example, 70 to 110 plies may be applied to form a relatively thicker portion at the hub interface. In preferred embodiments, around 90 plies may be used to form the thicker portion, and the number of plies may decrease spanwise toward the tool to form a stair-step shape. For example, after the thicker portion, a first plateau may comprise 70-80 plies, and a second plateau may comprise 40-60 plies. The thickness of the skin decreasing spanwise toward the root end enables, in conjunction with an expansion of an open slot formed by plies and/or an expansion of a trailing-edge opening, the tool to be pulled out from inside the skin, which allows the use of a single tool. This improves manufacturing efficiency. Additionally, this allows for an insert of a hub to be inserted into the root opening of the skin.

Referring to step 102, the skin is cured on the tool. The skin may be cured in an autoclave. A caul may be placed over an exterior surface of the skin, and the caul-skin-tool assembly may be positioned in an autoclave bag prior to curing the skin. The skin may be cured in a pressurized atmosphere of around 50-150 psi, and preferably around 90 psi. The skin may be cured at a temperature of around 300° F. to around 400° F., and preferably around 350° F. for about 4-8 hours, and preferably around 6 hours. In preferred embodiments, the skin is cured for about 6 hours in a pressure of about 90 psi and a temperature of about 350° F.

Referring to step 103, the skin is flexed so that the tool may be removed from an open slot defined by the skin. The flexing of the skin may expand the open slot and/or a trailing-edge opening. For example, the skin may be flexed so that the open slot and/or the trailing-edge opening expand by at least 20 to 80%. In some embodiments, the thickness of the leading-edge portion of the skin allows for the open slot and/or the trailing-edge opening to expand 80 to 100%. In some embodiments, the thickness of the leading-edge portion of the skin allows for the open slot and/or the trailing-edge opening to expand 100 to 200%. In some embodiments, the thickness of the leading-edge portion of the skin allows for the open slot and/or the trailing-edge opening to expand 200 to 500%. In some embodiments, the trailing-edge opening may have a height that is shorter than a thickness of the tool when the skin is not flexed, and the skin may be flexed so that the height of the trailing-edge opening is taller than the thickness of the tool so the tool can be removed from within the skin. In some embodiments, the open slot defined by the skin may have a height that is substantially the same as the thickness of the tool when the skin is not flexed, and the skin may be flexed so that the height of the open slot is tall enough so the tool can be removed from within the skin. The tool may be pulled out from the open slot through a root opening of the skin and/or through the trailing-edge opening. For example, the tool may be pulled spanwise out of the root opening, and/or the tool may be pulled chordwise out of the trailing-edge opening. Due to the thickness of the leading-edge portion of the skin, the skin is resilient and therefore operable to flex and return to its original shape. This enables the use of a single tool to form a monolithic skin that integrates spars, top skins, bottom skins, and leading-edge pieces, which improves manufacturing efficiency and costs. This step 103 may also include machining the trailing-edge portion to form the trailing-edge opening. The machining may include cutting, trimming, and/or sanding a section of the trailing-edge portion.

Referring to step 104, other components of the composite aerodynamic structure are attached to the skin. The other components may include a hub, fairing, wing tip, and a trailing-edge panel. The components may be manufactured via additive manufacturing, such as three-dimensional printing. The components may be attached to the skin via adhesives. For example, an insert of the hub may be inserted and bonded, via adhesive, to the hub interface of the skin. Additionally, a flange of the wing tip may be inserted and similarly bonded to an inner surface of the skin at the tip end. Similarly, a tab of trailing-edge panel may be inserted into the open slot of the skin and bonded therein. This step 104 may include forming the trailing-edge panel. The trailing-edge panel may be formed by sandwiching a metal layer, such as stainless steel, between a pair of non-metal layers, such as thermoplastic and/or fiberglass. The non-metal layers may be bonded to the metal layer via adhesive. The non-metal layers may be machined and/or molded to form the tab and a tapered portion. This step 104 may also include curing the composite structure. The curing may comprise heating the composite structure at around 150° F. at atmospheric pressure. By using adhesive to bond the components to the skin, minimal weight is added to the composite compared to using fasteners. Additionally, there is no increased aerodynamic drag caused by protruding portions of the fasteners.

The method 100 may include additional, less, or alternate steps and/or device(s), including those discussed elsewhere herein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of forming a monolithic skin of an aerodynamic structure with a leading edge and a trailing edge, the method comprising:
    positioning a plurality of plies on a tool to form a skin comprising a first integrated spar section extending spanwise between a root end and a tip end of the skin;
    curing the skin;
    flexing the skin so that a trailing-edge opening defined by a trailing-edge portion of the skin is expanded; and
    removing the skin from the tool by pulling the tool chordwise out of the trailing-edge opening of the skin.

2. The method of claim 1, wherein the step of removing the tool includes pulling the tool spanwise out of a root opening defined by the root end of the skin.

3. The method of claim 1, further comprising positioning a caul over an exterior surface of the skin before curing the skin in an autoclave.

4. The method of claim 1, further comprising inserting a tab of a trailing edge panel into the trailing-edge opening and bonding the tab to inside surfaces of the skin.

5. The method of claim 1, wherein the tool comprises a graded surface that imparts a complementary graded surface extending from an end of the first integrated spar section to the root end of the skin so that the skin decreases in thickness spanwise toward the root end from the end of the first integrated spar section.

\* \* \* \* \*